May 22, 1962  T. R. DICKINSON  3,035,809
SELF-LUBRICATING COMPRESSIBLE SLIDE GATE
Filed March 18, 1960
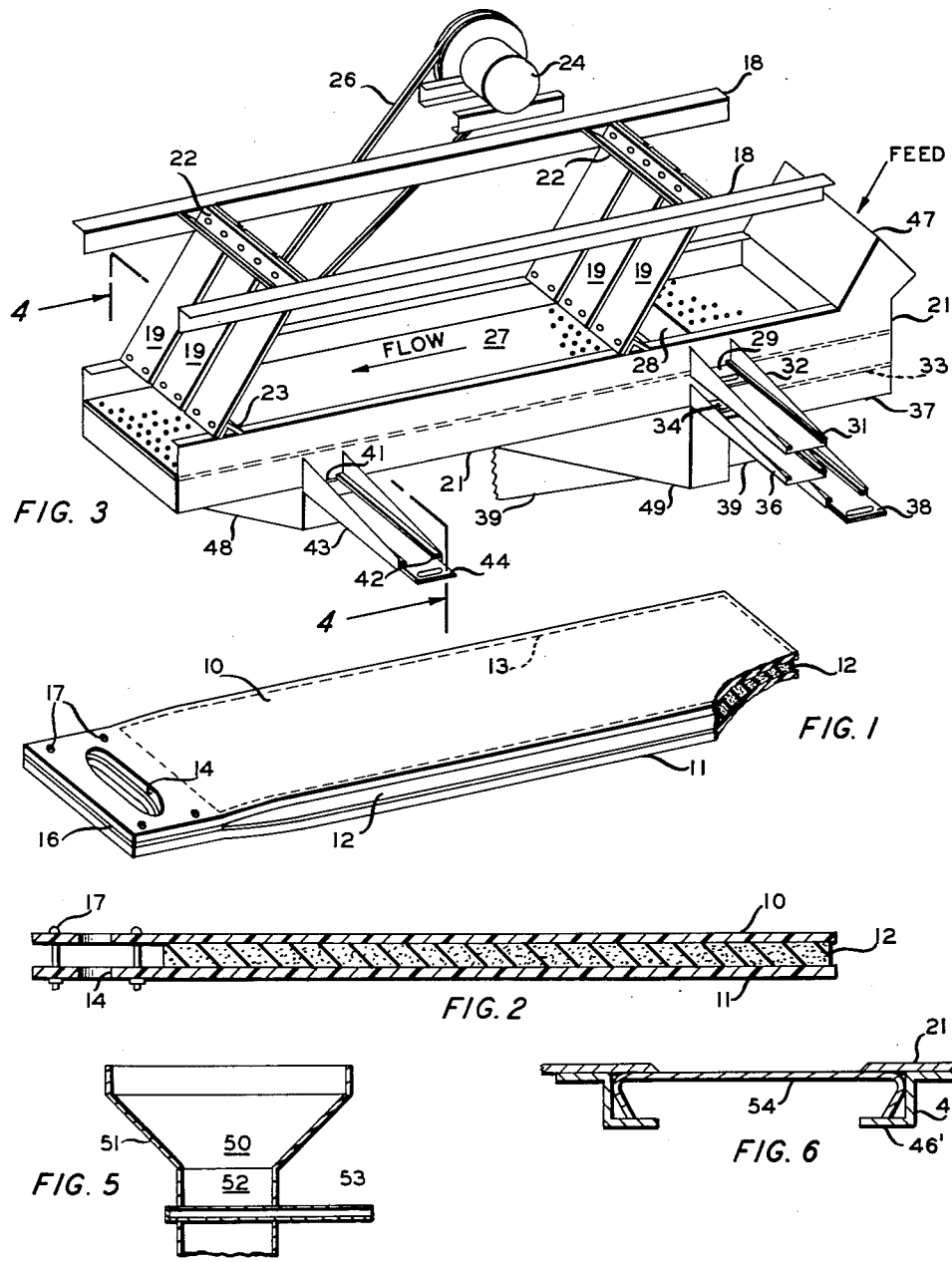
INVENTOR.
T. R. DICKINSON
BY 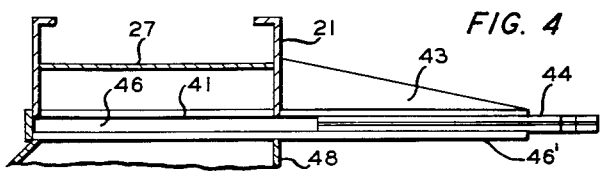
ATTORNEYS

United States Patent Office 3,035,809
Patented May 22, 1962

3,035,809
SELF-LUBRICATING COMPRESSIBLE SLIDE GATE
Travis R. Dickinson, Pasadena, Tex., assignor to Phillips Petroleum Company, a corporation of Delaware
Filed Mar. 18, 1960, Ser. No. 16,095
10 Claims. (Cl. 251—193)

This invention relates to a self-lubricating compressible slide gate. In one aspect this invention relates to gate structures employing said self-lubricating compressible slide gate. In another aspect this invention relates to a slide valve structure employing said self-lubricating compressible slide gate.

Closure devices and slide valves employing slide gates have long been known and used in the prior art. In the design of many such prior art devices the emphasis has been placed on simplification of construction to the extent that the sealing action of the resulting devices is often erratic and unreliable. In other prior art devices of this type employing a slide gate adequate sealing action has been obtained by employing complex combinations of closely machined components. However, such devices are subject to the deleterious effects of corrosion, accumulated foreign matter, etc. For example, the sealing action in such devices is impaired by the pitting action often resulting from corrosion, and accumulations of foreign matter, such as products of corrosion or gritty substances, tend to score the machined surfaces.

Prior art closure devices and slide valves employing slide gates are commonly made of metal. This results in metal to metal contact and the devices are frequently difficult to operate due to friction between the metal components. Said metal to metal contact results in wear and the resulting metallic particles often contaminate the material being stored in or passed through the apparatus wherein the closure device is employed. In many instances it is possible to employ lubricants to reduce friction and wear. However, in many other instances lubricants cannot be employed because of possible contamination of the products being stored in or passed through the apparatus employing said devices.

I have found that the above difficulties can be eliminated or substantially mitigated by providing a self-lubricating compressible slide gate in closure devices and slide valves wherein a slide gate is employed. The self-lubricating compressible slide gate of the invention is a laminated structure comprising a first layer of a self-lubricating plastic material having unexpectedly desirable properties for employment in the practice of the invention, a second layer of said plastic material, and a layer of a resilient material disposed between said layers of plastic material.

An object of this invention is to provide a self-lubricating compressible slide gate. Another object of this invention is to provide a gate structure employing said self-lubricating compressible slide gate. Still another object of this invention is to provide a slide valve structure employing said self-lubricating compressible slide gate. Another object of this invention is to provide a self-lubricating compressible slide gate wherein the sealing surfaces are made of a plastic material having unexpectedly desirable properties for this purpose. Still another object of this invention is to provide a compressible slide gate which is self-lubricating and requires no other lubrication. Still another object of this invention is to provide a self-lubricating compressible slide gate which, due to its structure, provides an effective sealing action at all times regardless of runner wear condition. Another object of this invention is to provide self-lubricating compressible slide gate which substantially eliminates runner wear. Still another object of this invention is to provide improved apparatus incorporating the self-lubricating compressible slide gate of the invention, such as scalping and classifying conveyors, storage bins, product distribution lines, etc. Still another object of this invention is to provide a self-lubricating compressible slide gate which eliminates metal to metal contact and thus eliminates contamination of stored or transported materials due to small particles of metal resulting from wear due to said metal to metal contact. Other aspects, objects and advantages of the invention will be apparent to those skilled in the art in view of this disclosure.

FIGURE 1 is a perspective view of one preferred embodiment of the self-lubricating compressible slide gate of the invention.

FIGURE 2 is a cross section view of another embodiment of the self-lubricating compressible slide gate of the invention.

FIGURE 3 is a perspective view of a vibrating conveyor illustrating one employment of a self-lubricating compressible slide gate of the invention.

FIGURE 4 is a cross section view along the lines 4—4 of FIGURE 3.

FIGURE 5 is a cross-section view of a storage vessel illustrating another employment of a self-lubricating compressible slide gate of the invention.

FIGURE 6 is a cross-section view illustrating a slide gate of the prior art positioned in place in the type runners employed in the vibrating conveyor of FIGURE 3.

Referring now to the drawings, the invention will be more fully explained. In said drawings like reference numerals have been employed to designate like elements.

The self-lubricating compressible slide gate of the invention illustrated in FIGURE 1 comprises a first sheet or layer 10 of a self-lubricating plastic material and a second sheet or layer 11 of said plastic material. Disposed between said first and said second layer of plastic material is a layer 12 of a resilient material, such as a sponge rubber. Said layers or sheets of said plastic material are secured to opposite sides of said layer of resilient material by means of any suitable adhesive or cement capable of forming a firm bond between said plastic material and said resilient material. It will be noted that the dimensions of said layer of resilient material 12 are slightly smaller than the dimensions of said layers of plastic material as indicated by the dotted lines 13. One end of said first or upper layer 10 of said plastic material extends beyond one end of said layer 12 of resilient material. An opening 14 is provided in said extended end portion of said layer 10 of plastic material. In a similar manner, one end of said second or lower layer 11 of plastic material also extends beyond one end of said layer 12 of resilient material. As shown in said FIGURE 1, said extended end portion of said layer 11 also is provided with an opening 14 extending therethrough. Said layers 10 and 11 of plastic material, and the openings therein, are identical thus facilitating manufacture thereof by mass production means. A shim 16 is disposed between said extended end portions of said layers 10 and 11 of plastic material. Said shim 16 is also provided with an opening 14 which is of the same size as said openings 14 in said layers 10 and 11. A plurality of bolts 17 are positioned on opposite sides of said openings 14 and extend through said first or upper layer of plastic material 10, said shim 16, and said second or lower layer 11 of plastic material for securing same together in the manner shown to form a handle for the compressible slide gate. The approximate thickness of said shim 16 is determined by the overall compressed thickness of the slide gate when it is mounted in the runners, as discussed hereinafter.

FIGURE 2 illustrates another, presently less preferred, embodiment of the self-lubricating compressible slide gate of the invention which is like that illustrated in FIGURE 1 except that said shim 16 has been omitted. Bolts 17 are provided however to secure the extended ends of layers 10 and 11 together so that when a pull is exerted upon one of said layers, said pull will be transmitted to the other of said layers by means of said bolts 17 which otherwise "float" in the openings provided in said layers 10 and 11.

FIGURE 3 is a diagrammatic illustration of a vibrating conveyor wherein the self-lubricating compressible slide gates of the invention are advantageously employed. Said vibrating conveyor comprises suitable supporting means such as supporting members 18 from which there is suspended, by means of spring members 19, a conveyor pan 21. Said spring members 19 are attached at their upper ends to suitable bar members 22 which are in turn attached to said support members 18 in any suitable manner, as by welding. The lower end of said spring members 19 are attached to suitable bar members 23 which are attached to said pan 21 in any suitable manner, as by welding. Support members 18 are fixed, such as being suspended from the ceiling or other fixed object by means not shown. Said spring members 19 are of a flexible material such as fiberglass and serve to flexibly support said pan 21. Motor 24 drives belt 26 which in turn drives an eccentric gear arrangement (not shown) for imparting a vibrating motion to said pan 21. Said springs 19 aid in maintaining said vibration motion. Said vibrating motion is a reciprocating motion and, when once started, is largely maintained by the action of said springs 19 with only a small amount of power from said motor.

Said pan 21 is provided with a scalping screen 27 comprising a perforated plate. Although not shown in the drawing for purposes of simplicity, it will be understood that the indicated perforations extend throughout the length and width of said screen 27 except for the portion thereof traversed by gate opening 28. As here illustrated, gate opening 28 is closed by means of a first slide gate 29 fabricated in accordance with the self lubricating compressible slide gate illustrated in FIGURE 1. Said slide gate 29 operates in a pair of runners 31 which are attached to opposite sides of the gate opening 28 provided in scalping screen 27, extend through the wall of pan 21, and along the lower portion of runner supports 32.

A fines screen 33 is provided below said scalping screen 27 in the upstream end portion of said pan 21. Said fines screen 33 is provided with a gate opening (not shown), similar to gate opening 28 in scalping screen 27, which is directly below said gate opening 28. As here shown, said gate opening in said fines screen 33 is also closed by means of a second slide gate 34 fabricated in accordance with the invention and as illustrated in FIGURE 1. Said slide gate 34 also operates in a pair of runners positioned in the lower portion of runner supports 36 and traversing the bottom of said pan 21. Said fines screen terminates at the upstream side of the gate opening shown to be closed by slide gate 34. A third gate opening (not shown) is provided in the bottom of the downwardly extending upstream end portion 37 of said pan 21. Said gate in the bottom of said end portion 37 is provided with a third slide gate 38 fabricated in accordance with the invention. As here shown, said slide gate 38 is in open position to permit fines collecting in said bottom portion 37 to be discharged through discharge conduit 39.

A fourth gate opening 41 is provided in the downstream end portion of the bottom of said pan 21. Said gate opening 41 is provided with a pair of runners 42 which extend along the lower portion of runner support 43 as shown, and are attached to opposite sides of opening 41 which extends across the bottom of pan 21. A fourth slide gate 44 fabricated in accordance with the invention is provided and operates in said runners 42 for closing said gate opening 41 when desired. Said runners 31 and 42 are substantially like the runners 46 illustrated in FIGURE 6.

In the operation of the device illustrated in FIGURE 3 a material to be classified is introduced into upstream feeder opening 47 from any suitable source. Said material to be classified can be any material which can be classified by a screening action such as, for example, pellets of solid polyethylene plastic. Said polyethylene pellets flow from feeder opening 47 onto the top of sclaping screen 27 which retains oversized pellets. Pellets having the desired size range pass through scalping screen 27 and are retained on fines screen 33 which permits undersized pellets to fall therethrough and be collected in said bottom portion 37. The desired size range particles collected on fines screen 37 are transported by the vibrating action of the conveyor to the downstream end portion of pan 21 where they fall through said gate opening 41 and are transported through discharge chute 48 to storage or further processing. Since the entire pan assembly is vibrating in a manner to cause the downstream movement of all of the pellets regardless of size, the oversized pellets are discharged off the downstream end of said scalping screen 27 and collected in a suitable collector chute not shown. Fines collected in the bottom portion 37 are discharged through discharge chute 39. If during operation it is desired for any reason to discharge the entire feed material, except fines, this can be accomplished by opening slide gates 29 and 34 to permit the material to be discharged through chute 49.

FIGURE 4 illustrates more clearly the relationship when slide gate 44 is in the open position in gate opening 41. Said slide gate 44 would be closed when it was desired to prevent off specification pellets from entering product chute 48. In such instances said off specification pellets can be discharged out the downstream end of pan 21 and collected with the oversized pellets discharged from the end of scalping screen 27.

FIGURE 5 illustrates another employment of the self-lubricating compressible slide gate of the invention as employed in a conventional hopper 50. Said hopper 50 comprises a housing 51 incorporating a passage 52. In said FIGURE 5 the slide gate has been omitted and only the runners traversing the passage 52 leading from said hopper 50 are shown. It will be understood that a slide gate of the invention, for example one in accordance with FIGURE 1 or 2 or other embodiment, can be inserted in the runners 53 traversing said passage 52.

FIGURE 6 illustrates one type of runners 46 which can be employed at the gate openings of the conveyor of FIGURE 3. Any suitable type of runner providing an upper and a lower support member for the compressible slide gate of the invention can be employed in said gates or openings. The runners here illustrated are of the type provided at gate opening 41 in the bottom of pan 21. As here shown a portion of the bottom of pan 21 forms the upper support member of the runner 46 and horizontal member 46' provides the lower support member. In the practice of the invention, for maximum advantageous employment of the compressible slide gate of the invention, it is necessary that the space or opening between said upper and said lower supporting members of the runners be less than the thickness of said slide gate so as to compress said slide gate and obtain maximum sealing action.

FIGURE 6 also illustrates a conventional slide gate 54 of the prior art. It will be noted that said prior art slide gate is of metal and is subject to wear with use, particularly when employed in vibrating conveyors such as the device of FIGURE 3, which wear causes said slide gate 54 to become loose fitting and permit products other than those desired to enter into the opening which it is supposed to close. It will be noted that the metal to metal contact between slide gate 54 and runners 46 in FIGURE 6 is very conducive to said wear and results in the formation of fine metal particles which frequently are an undesirable contaminant in the products being classified.

Self-lubricating plastic materials suitable for use in the practice of the invention are the normally solid polymers of 1-olefins having a density within the range of 0.940 to 0.980, preferably 0.950 to 0.963, gram per cubic centimeter, and a molecular weight within the range of about 35,000 to 250,000. As used herein and in the claims, unless otherwise specified, the term "polymer" includes both homopolymers of said 1-olefins as well as copolymers of one of said 1-olefins with another of said 1-olefins as a comonomer. The 1-olefins having from 2 to 4 carbon atoms per molecule are usually preferred for preparing the polymer plastic materials used in the practice of the invention. However, any normally solid polymer of a 1-olefin having the properties set forth herein can be used in the practice of the invention. Methods for preparing and fabricating such normally solid polymers of said 1-olefins are well known to those skilled in the art. A preferred method for preparing said normally solid polymers of 1-olefins is that described and claimed in U.S. Patent 2,825,721 issued March 4, 1958, to J. P. Hogan et al. Polymers prepared in accordance with the method of said patent are available commercially under the trade mark Marlex.

A presently preferred plastic material for use in the practice of the invention is a polyethylene prepared in accordance with the method of said patent and having a density of at least 0.940 gram per cc. at 73–78° F., and a molecular weight of at least 35,000. This classification includes, in addition to homopolymers of ethylene, copolymers of ethylene with higher monoolefins and diolefins, e.g., propylene and 1-butene, the higher comonomer generally being incorporated into the copolymer molecule in small proportions as compared with the ethylene monomer. Any desired amount of said comonomer can be utilized to form the copolymers so long as the density of the resulting copolymers is at least 0.940 gram per cc. Preferably, the polyethylene utilized has a density in the range of about 0.950 to 0.963 gram per cc. and a molecular weight in the range of about 35,000 to about 250,000.

Polyethylenes having the characteristics disclosed hereinbefore generally have a flexural modulus (determined at 73° F. in accordance with ASTM Method D–790–49T) or at least 100,000, and usually within the range of 160,000 to 240,000 p.s.i. These polyethylenes also have a brittleness temperature (determined according to ASTM Method D 746–55T) not greater than −20° F. and generally from −100 to below −180° F. These properties appear to explain, at least in part, the great suitability of the polyethylenes disclosed above for use in fabricating the self-lubricating compressible slide gate of the invention.

Another property of this type polyethylene which appears to explain partially the suitability for the purposes of this invention is the fact that the impact strength of the polyethylene remains at a desirably high value even at very low temperatures, varying relatively slightly over a broad temperature range. Izod impact strength is measured in accordance with the ASTM Method D 256–54T, utilizing a ¼-inch bar of the tested plastic. One polyethylene which is illustrative of polyethylene suitable for the purposes of the present invention has a density of approximately 0.960, a molecular weight of about 40,000, a melt index (ASTM Method D–1238–52T) of 0.7 and an Izod impact strength at 70° F. of approximately 3.0 foot-pounds per inch notch. The impact strength of 0° F. of this polyethylene is 2.0, and the impact strength at −100° F. is 1.0 foot-pound per inch notch.

Another property of the polyethylenes specified herein is that they have exceedingly low coefficients of friction as compared with other plastics. The numerical magnitude of the coefficient of friction of a particular material will depend upon the particular method of measurement used, as well as the material against which the tested material is contacted in measuring the coefficient of friction.

Thus, in one method of measuring the coefficient of friction, involving rubbing a ½-inch diameter moving ball of the tested material against three stationary balls or disks of the plastics to be tested, in the absence of added lubricant, nylon (a polyamide resin) had a coefficient of friction of 0.550 at a 10-kilogram load and 0.218 at a 40-kilogram load, Teflon (a solid polymer of tetrafluoroethylene) had a coefficient of friction of 0.245 at a 10-kilogram load and a coefficient of friction of 0.046 at a 40-kilogram load, and a 0.960-density polyethylene having a molecular weight of 40,000 had a coefficient of friction of 0.100 at a 10-kilogram load and a coefficient of friction of 0.016 at a 40-kilogram load. This test procedure ("Friction and Wear") is more fully disclosed in a pamphlet entitled "Lubricants Test Illustrations, May 1,1953, United States Steel Lubricants Testing Laboratory, National Tube Division, 327 Craft Avenue, Pittsburgh 13, Pennsylvania.

The low coefficients of friction of the above described polyethylenes illustrates the self-lubricating properties of the 1-olefin polymers which can be employed in the practice of the invention. These self-lubricating properties exist through a wide range of temperatures extending from temperatures far below the freezing point of water to temperatures extending well above the boiling point of water and approaching the melting point of the polymers, thus making self-lubricating compressible slide gates fabricated in accordance with the invention and employing said polymers adapted for use over a wide range of temperature.

Said low coefficients of friction of course contribute to the remarkable wear resisting properties of the above described polymers of 1-olefins which can be employed in the practice of the invention. Said polymers have exhibited outstanding resistance to wear in the service described herein and in even more severe services.

A number of compressible slide gates were fabricated in accordance with the invention and essentially as illustrated in FIGURE 1. In said slide gates the upper plastic layer 10 had an overall length of 21 inches, an overall width of 5⅛ inches, and a thickness of ¼ inch. The lower layer 11 of plastic material had the same dimensions of said upper layer 10. Both of said layers of plastic material were fabricated from a polyethylene having a density of about 0.960, a melt index of about 0.9, an Izod impact strength of about 4.0 foot pounds per inch notch, and a molecular weight of approximately 40,000. The layer 12 of resilient material had an overall length of 18⅞ inches, an overall width of 4⅞ inches, and a thickness of ½ inch, uncompressed. These dimensions are reflected by the dotted line 13 in FIGURE 1. It is important that the layer of resilient material have an uncompressed width slightly less than the layers of plastic material, and that the inboard end of said layer of resilient material be recessed inward from the inboard ends of said layers of plastic material as shown by said dotted lines, in order to avoid having said resilient material protrude beyond said layers of plastic material when the slide gate is compressed in installation and operation. It is believed clear the amount of space to be left between the edges of said layer of resilient material and the edges of said layers of plastic material will depend upon the thickness of said resilient material and how much it is to be compressed. Said resilient material was a commercially available sponge rubber available under the trade name of Foamex. Any suitable sponge rubber or foamed latex can be employed as said resilient material.

As indicated by the shorter length of said layer of resilient material, an end portion of both the upper and lower layers of plastic material extends beyond one end of said layer of resilient material. As illustrated, there was provided in the extended ends of each of said upper and lower layers of plastic material an opening having a width of about one inch and a length of about 4 inches. In the embodiment of the invention illustrated in FIG- URE 1 a shim, made of the same polyethylene as said upper and lower plastic layers, having a thickness of 1/8 inch, a width of 2 inches and a length of 5 1/8 inches was inserted between said extended ends of said upper and lower layers. Said upper and lower layers were then bolted together as illustrated.

As indicated elsewhere herein, the thickness of shim 16 will be determined by the amount of compression to be applied to the assembled slide gate. In operation said slide gate is installed in a pair of runners each having a first or upper supporting member and a second or lower supporting member. The amount of compression applied to said assembled slide gate is determined by the space or distance between said upper and lower supporting members. In the specific example described herein, the space between said upper and lower supporting members of said runners was about 5/8 inch. Since the normal or uncompressed thickness of the assembled slide gate was 1 inch, it was compressed in installation to a thickness of about 5/8 inch. This compression is effected on the resilient material and compresses same to a thickness of about 1/8 inch because the 1/4 inch thick layers of plastic material are not compressed. Thus, in the described example, said shim 16 had a thickness of 1/8 inch.

Said shim 16 is preferably fabricated from the same plastic material as said layers 10 and 11. However, since said shim is between said layers of plastic and does not contact said runners, any other suitable material can be employed to fabricate said shim.

In fabricating said compressible slide gate one surface of each of said upper and lower layers of plastic material was roughened, as by sanding. The roughened surfaces were then oxidized with an open flame. A cement, Rubba-Weld, was then applied to the oxidized surfaces immediately and the layer of resilient material was sandwiched between said upper and lower plastic layers immediately. Said cement sets rapidly under nominal pressure to form a firm bond between said resilient material and said layers of plastic material. After said bond had been formed, the shim described above was inserted between the extended ends of the upper and lower layers of plastic material and said shim and said extended ends were bolted together to form a handle for the compressible slide gate as illustrated in FIGURE 1 and described above.

The compressible slide gates, fabricated as described, were installed in a vibrating conveyor, substantially like that illustrated in FIGURE 3, and tested for a period extending over several months. As will be recognized by those skilled in the art this is a severe test for slide gates of this type in that the apparatus is constantly vibrating and thus constantly subjecting the slide gates to wear forces in addition to the wear normally encountered when said slide gates are manipulated in the runners. At the end of the test period there were no visible signs of wear on the compressible slide gates of the invention and said slide gates were found to be satisfactory in every respect.

Any resilient material can be employed for the layer of resilient material which is sandwiched between the two layers of plastic material. So-called foam or sponge rubbers are the presently preferred resilient material. Many methods for the manufacture of these materials in commercial quantities are known to those skilled in the art. Any suitable foam or sponge rubber manufactured according to one of said methods can be employed.

As indicated above the compressible slide gate of the invention possesses many advantages over the slide gates of the prior art. One of the most outstanding of these advantages is the self-lubricating feature which is afforded by the self-lubricating properties of the plastic materials employed. It is never necessary to lubricate a slide gate fabricated in accordance with the invention. As will be recognized by those skilled in the art, this an important advantage, particularly in those instances where contamination of the product being stored or transported in the apparatus where the slide gate is employed must be avoided.

Another outstanding advantage is the self-sealing feature afforded by the sandwich or laminated construction of the slide gate. It is believed clear from the above description that the slide gate of the invention will always be self-sealing and will compensate for any wear which may occur even though such wear is normally very small.

Still another advantage of the invention is that metal to metal contacts with the resultant wear and formation of small particles of metal which can contaminate materials being handled is avoided.

Still another advatage is the chemical resistance of the slide gates of the invention. The polymers of 1-olefins described herein are unusually resistant to chemical attack.

The term "density" as used herein and in the claims, unless otherwise specified, is intended to signify a density determined in accordance with ASTM Method D 1505–57T.

The term "molecular weight" as used in the present disclosure and claims is determined as follows:

The molecular weight determination is based upon a measurement of the intrinsic viscosity of the polyethylene. The intrinsic viscosity is determined by measuring the time required for a filtered solution of 0.1000 gram of the polyethylene in 50 ml. of tetralin (measured at room temperature, i.e., about 75° F.) to run through the marked length on a size 50 (0.8–3.0 centistokes) Ostwald-Fenske viscosimeter at a temperature of 130° C. (the viscosimeter being immersed in a thermostatically controlled oil bath) and measuring also the time required for an equal volume of tetralin containing no polyethylene to run through the same distance on the same viscosimeter. The molecular weight is calculated in accordance with the following formula:

$$M_w = \frac{K 2.303 \log Vr}{C}$$

where $K = 24{,}450$
$C = 0.183$
$Vr$ = time, in seconds, required for solution to run through viscosimeter divided by the corresponding time required for the polymer-free tetralin, both at 130° C.

A single determination of molecular weight ordinarily has a precision of ±1000 molecular weight units.

While the compressible slide gate of the invention has been described and illustrated as employed in an apparatus for the manufacture of polyethylene it is believed clear the invention is not so limited. Slide gates having other dimensions and embodying the principles of the invention can be employed in any type of apparatus employed for the storage and handling of various other types of materials such as fertilizer, coal, carbon black, beans, flour, soap powders, etc. Said slide gates can also be employed in apparatus handling fluids, subject of course to reasonable pressure limitations depending upon specific design, etc.

While certain embodiments of the invention have been described for illustrative purposes the invention obviously is not limited thereto. Various other modifications will be apparent to those skilled in the art in view of this disclosure. Such modifications are within the spirit and scope of the invention.

I claim:

1. A self-lubricating compressible slide gate comprising: a first layer of a self-lubricating normally solid polymer of ethylene having a density within the range of 0.940 to 0.980 grams per cc., and a molecular weight within the range of 35,000 to 250,000; a second layer of said solid polymer; and a layer of resilient material disposed between and secured to each of said layers of said solid polymer.

2. A self-lubricating compressible slide gate comprising: a first layer of a self-lubricating plastic material consisting essentially of a normally solid polymer of a 1-olefin, said layer being provided with an opening therethrough in one end portion thereof; a layer of resilient material having one side thereof secured to one side of said first layer of plastic material except for said end portion having said opening therein; a second layer of said plastic material also provided with an opening in one end portion thereof; said second layer of plastic material being secured to the other side of said layer of resilient material with said opening in said second layer of plastic material aligned with said opening in said first layer of plastic material; and a plurality of bolts extending through said first and said second layers of plastic material on opposite sides of said openings in said end portions.

3. A self-lubricating compressible slide gate comprising: a layer of resilient material; a first layer of a self-lubricating plastic material secured to one side of said resilient material with one end portion thereof extending beyond one end of said layer of resilient material, said plastic material consisting essentially of a normally solid polymer of a 1-olefin; an opening provided in said extended end portion of said first layer of plastic material; a second layer of said plastic material secured to the other side of said resilient material with one end portion thereof extending beyond said end of said resilient material; an opening provided in said extended end portion of said second layer of plastic material; a shim, having an opening therein, disposed between said extended ends of said layers of plastic material, said shim having a thickness less than the thickness of said layer of resilient material; said openings in said shim, said first layer of plastic material, and said second layer of plastic material being aligned with each other; and means securing said extended ends of said layers of said plastic material and said shim together to form a handle for said gate.

4. A self-lubricating compressible slide gate comprising: a layer of sponge rubber; a first layer of polyethylene plastic possessing self-lubricating properties secured to one side of said layer of sponge rubber with one end portion thereof provided with an opening therethrough and extending beyond one end of said layer of sponge rubber; a second layer of said polyethylene plastic secured to the other side of said layer of sponge rubber with one end portion thereof provided with an opening therethrough and also extending beyond said end of said layer of sponge rubber, said opening in said second layer of polyethylene plastic being aligned with said opening in said first layer of polyethylene plastic; a shim, having an opening provided therein, disposed between said layers of polyethylene plastic with said last mentioned opening in alignment with said openings in said layers of polyethylene plastic; and means for securing said layers of polyethylene plastic and said shim together to form a handle for said slide gate.

5. A gate structure comprising, in combination: a pair of spaced apart runners; a self-lubricating compressible slide gate compressibly and slidably mounted in said runners, said slide gate comprising: a first layer of a self-lubricating plastic material consisting essentially of a normally solid polymer of ethylene having a density within the range of 0.940 to 0.980 grams per cc., and a molecular weight within the range of 35,000 to 250,000; a second layer of said plastic material; and a layer of resilient material disposed between and secured to each of said layers of plastic material.

6. A gate structure comprising, in combination: a pair of spaced apart runners; and a self-lubricating compressible slide gate compressibly and slidably mounted in said runners; said slide gate comprising: a layer of sponge rubber; a first layer of polyethylene plastic possessing self-lubricating properties secured to one side of said layer of sponge rubber with one end portion thereof provided with an opening therethrough and extending beyond one end of said layer of sponge rubber; a second layer of said polyethylene plastic secured to the other side of said layer of sponge rubber with one end portion thereof provided with an opening therethrough and also extending beyond said end of said layer of sponge rubber, said opening in said second layer of polyethylene plastic being aligned with said opening in said first layer of polyethylene plastic; a shim, having an opening provided therein, disposed between said layers of polyethylene plastic with said last mentioned opening in alignment with said openings in said layers of polyethylene plastic; and means for securing said layers of polyethylene plastic and said shim together to form a handle for said slide gate.

7. A slide valve structure comprising, in combination: a housing, said housing incorporating a passageway; a pair of spaced apart guide runners defining a plane which traverses said passageway; and a self-lubricating compressible slide gate compressibly and slidably mounted in said guide runners for opening and closing said passageway, said slide gate comprising: a first layer of a self-lubricating plastic material consisting essentially of a normally solid polymer of ethylene having a density within the range of 0.940 to 0.980 grams per cc., and a molecular weight within the range of 35,000 to 250,000; a second layer of said plastic material; and a layer of resilient material disposed between and secured to each of said layers of plastic material.

8. A slide valve structure comprising, in combination: a housing, said housing incorporating a passageway; a pair of spaced apart guide runners defining a plane which traverses said passageway; and a self-lubricating compressible slide gate compressibly and slidably mounted in said guide runners for opening and closing said passageway, said slide gate comprising: a layer of sponge rubber; a first layer of polyethylene plastic possessing self-lubricating properties secured to one side of said layer of sponge rubber with one end portion thereof provided with an opening therethrough and extending beyond one end of said layer of sponge rubber; a second layer of said polyethylene plastic secured to the other side of said layer of sponge rubber with one end portion thereof provided with an opening therethrough and also extending beyond said end of said layer of sponge rubber, said opening in said second layer of polyethylene plastic being aligned with said opening in said first layer of polyethylene plastic; a shim, having an opening provided therein, disposed between said layers of polyethylene plastic with said last mentioned opening in alignment with said openings in said layers of polyethylene plastic; and means for securing said layers of polyethylene plastic and said shim together to form a handle for said slide gate.

9. A gate structure comprising, in combination: a pair of spaced apart runners, each of said runners comprising a pair of spaced apart support members; and a self-lubricating compressible slide gate slidably mounted between said support members of said runners, the distance said support members are spaced apart being less than the normal thickness of said slide gate so as to compress said slide gate when it is mounted in said runners; said slide gate comprising: a first layer of a self-lubricating plastic material consisting essentially of a normally solid polymer of ethylene having a density within the range of 0.940 to 0.980 grams per cc., and a molecular weight within the range of 35,000 to 250,000; a second layer of said plastic material; and a layer of resilient material disposed between and secured to each of said layers of plastic material.

10. A gate structure comprising, in combination: a pair of spaced apart runners, each of said runners comprising a pair of spaced apart support members; and a self-lubricating compressible slide gate slidably mounted between said support members of said runners, the distance said support members are spaced apart being less than the normal thickness of said slide gate so as to compress said slide gate when it is mounted in said runners; said slide gate comprising: a layer of sponge rubber; a first layer of polyethylene plastic possessing self-lubricating properties secured to one side of said layer of sponge rubber with one end portion thereof provided with an opening therethrough and extending beyond one end of said layer of sponge rubber; a second layer of said polyethylene plastic secured to the other side of said layer of sponge rubber with one end portion thereof provided with an opening therethrough and also extending beyond said end of said layer of sponge rubber, said opening in said second layer of polyethylene plastic being aligned with said opening in said first layer of polyethylene plastic; a shim, having an opening provided therein, disposed between said layers of polyethylene plastic with said last mentioned opening in alignment with said openings in said layers of polyethylene plastic; and means for securing said layers of polyethylene plastic and said shim together to form a handle for said slide gate.

References Cited in the file of this patent

UNITED STATES PATENTS

| | | |
|---|---|---|
| 1,324,990 | Weber | Dec. 16, 1919 |
| 2,293,017 | Gleeson | Aug. 11, 1942 |
| 2,769,460 | Richterkessing | Nov. 6, 1956 |

FOREIGN PATENTS

| | | |
|---|---|---|
| 1,124,566 | France | of 1956 |